Patented Mar. 7, 1933

1,900,866

UNITED STATES PATENT OFFICE

JAMES S. OFFUTT, OF CHICAGO, ILLINOIS, ASSIGNOR TO UNITED STATES GYPSUM COMPANY, OF CHICAGO, ILLINOIS, A CORPORATION OF ILLINOIS

ACOUSTICAL PLASTER

No Drawing.    Application filed March 28, 1930.   Serial No. 439,851.

This invention relates to acoustical material, and has reference more particularly to a cementitious acoustical composition adapted to be molded into shapes, or to be applied to a wall of ceiling with a trowel.

Acoustical plasters are applied to the walls and ceilings of buildings by means of a trowel, and are usually composed of a porous aggregate with a binding agent, together with other ingredients. After application to the wall, the surface of the acoustical plaster is "floated" by passing a wooden trowel, or other instrument over the surface to open the pores by removing a portion of the surface.

One of the disadvantages of acoustical plasters heretofore used is that they do not require a high percentage of water to bring to troweling consistency, with the result that a dry wall having a high suction quickly removes the small amount of water contained in the mixture so that plasticity is low and troweling is difficult. Because of this tendency, the surface must be floated immediately after application by the plasterer. The older types of plasters also have the disadvantage that a slight excess of water "floods" the composition so that the pores do not open up on floating, and as a result, the finished plastered surface had a low sound absorption. Another difficulty developed in the older plasters is that they did not adhere well together, with the result that a large part of the particles drop off during the floating operation.

An object of this invention, therefore, is to produce an improved acoustical plaster having a high water content when brought to troweling consistency, so that improved plasticity and troweling ease is obtained; also the water content is not critical, and the composition is not easily flooded by an excess of water.

Another object of the invention is to produce an acoustical plaster which does not dry out quickly on a wall having a high suction, so that the floating operation need not follow immediately after the plastering operation.

A further object of the invention is to provide an acoustical plaster in which the coarse, porous aggregate adheres well together, and does not fall off to a large extent during the floating operation.

A still further object of the invention is to provide an acoustical plaster which may be applied evenly to a building, making a smooth surface which may be evenly floated to produce a pleasing appearance of high sound absorption; also, to improve acoustical plaster in other respects hereinafter specified and claimed.

The present invention is an improvement in the acoustical plaster described and claimed in the copending application of Carlisle K. Roos, Serial No. 166,600; now Patent No. 1,871,806; for which application for reissue was filed October 18, 1932, Serial No. 638,414; allowed January 19, 1933.

While it should be understood that my composition can be varied considerably in percentages of different ingredients, the following will give an example of the preferred formula:

|  | Per cent |
|---|---|
| Calcined gypsum | 30. |
| Graded marble, passing 8 mesh retained on 28 mesh | 30. |
| California pumice, passing 8 mesh, retained on 28 mesh | 38. |
| Ballmilled asbestos | 1. |
| Special wood fiber | 0.8 |
| Commercial retarder | 0.17 |
| Soap bark (saponin) | 0.03 |
|  | 100 |

The wood fiber is a novel ingredient in acoustical plasters, and I have found that fibers having a length of $\frac{1}{8}''$ to $\frac{1}{4}''$ and a diameter of $.003''$ to $.01''$ are best suited for the purpose. Wood fibers of this size have a property of considerably increasing the water carrying capacity of the composition at troweling consistency, prevent the composition from losing water because of the suction of a dry wall, and gives the resulting composition a greater porosity, and, therefore, a greater sound absorption because of the fact that a large amount of water has dried out of the composition leaving voids in its place. This wood fiber also causes the porous aggregate particles to cling together better, and they are prevented from falling off to an objectionable extent during the subsequent floating operation. Other cellulose fibers, such as paper, cotton, cane etc., may be substituted for the wood fibers with fair results. The precentage of fibers may vary from 0.5 to 1.5%.

The ballmilled asbestos is also a novel ingredient as used in acoustical plaster. It is prepared by placing medium fibered asbestos in a ballmill, and pulverizing same until all of this asbestos will float on water in a decantation test. In this ultra-fine condition, the asbestos considerably increases the plasticity and easy troweling of the resulting composition when applied to a building wall or ceiling. Because of the high plasticity of the resulting composition, the finished surface is smooth and free from "cat faces" and unfloated areas. The percentage may vary from 0.5% to 2% or this ingredient may be entirely omitted with a sacrifice of high plasticity.

Instead of pumice, other light weight aggregates may be used, such as slag, haydite, volcanic lava etc. Other granular mineral aggregate such as quartz, rock etc., may be used instead of the marble if desired or the granular aggregate may be entirely replaced with pumice if desired. The percentage of calcined gypsum, marble and pumice may be varied 10% in either way from the percentage given in the preferred formula with good results. The soap bark may be omitted, as retarder is a gas entraining agent; but the use of soap bark or other gas entraining agent, such as licorice extract, glue, etc., is desirable.

The finished composition will carry approximately 50% more water at troweling consistency than the older type of acoustical plasters. I have found that my improved acoustical plaster will cover approximately 9 per cent more area than that previously obtained. It has a high sound absorption and a high porosity. A considerable period may intervene between application of the plaster and the floating operation without making the floating operation too difficult. The composition may be molded in special molds to form tiles or other desired shapes for constructional uses. A somewhat similar composition, but modified so as to be applicable for use in damp localities, is described in my co-pending application Ser. No. 483,133.

I would state in conclusion that while the above description represents a practical embodiment of my invention, I do not wish to limit myself precisely to these details, since manifestly, the same may be considerably varied without departing from the spirit of the invention, as defined in the appended claims.

Having thus described my invention, I claim as new and desire to secure by Letters Patent:—

1. A sound-absorbing wall plaster composition comprising calcined gypsum, a graded sized aggregate, a saponin foaming agent, a retarder for the gypsum, and substantially 1% each of extremely finely divided ground asbestos to increase the plasticity of the plaster when gaged with water and of elongated wood-fibers which are capable of expanding when wetted and of shrinking on subsequent drying thereby insuring connected porosity in the final set product, the ratio of aggregate to the gypsum being at least 2:1.

2. A sound-absorbing wall plaster composition comprising calcined gypsum, a graded sized aggregate of marble and pumice, soap-bark, a retarder for the gypsum, and substantially 1% each of extremely finely divided ground asbestos to increase the plasticity of the plaster when gaged with water and of elongated wood-fibers which are capable of expanding when wetted and of shrinking on subsequent drying thereby insuring connected porosity in the final set product, the ratio of aggregate to the gypsum being at least 2:1.

3. A sound-absorbing surface for walls, ceilings and the like consisting of the set product resulting from the gaging with water of the composition claimed in claim 1.

4. A sound-absorbing surface for walls, ceilings and the like consisting of the set product resulting from the gaging with water of the composition claimed in claim 2.

JAMES S. OFFUTT.